United States Patent
Maier-Landgrebe

(10) Patent No.: US 7,400,962 B2
(45) Date of Patent: Jul. 15, 2008

(54) METHOD AND DEVICE FOR REGULATING THE DRIVE TORQUE FOLLOWING A LOAD CHANGE IN HYBRID VEHICLES

(75) Inventor: Rolf Maier-Landgrebe, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 728 days.

(21) Appl. No.: 10/468,661

(22) PCT Filed: Nov. 13, 2002

(86) PCT No.: PCT/DE02/04194

§ 371 (c)(1), (2), (4) Date: Feb. 6, 2004

(87) PCT Pub. No.: WO03/055713

PCT Pub. Date: Jul. 10, 2003

(65) Prior Publication Data

US 2004/0117101 A1  Jun. 17, 2004

(30) Foreign Application Priority Data

Dec. 21, 2001 (DE) ............................... 101 63 208

(51) Int. Cl.
- *B60K 28/16* (2006.01)
- *G06F 7/14* (2006.01)
- *G06F 17/00* (2006.01)

(52) U.S. Cl. .......................... 701/84; 701/82; 180/197

(58) Field of Classification Search ................ 701/71, 701/89, 84, 37, 82; 303/146, 151, 152, 167; 180/197; 477/20, 27
See application file for complete search history.

(56) References Cited

U.S. PATENT DOCUMENTS

| | | | |
|---|---|---|---|
| 6,353,786 B1 * | 3/2002 | Yamada et al. | ................. 701/70 |
| 6,508,523 B2 * | 1/2003 | Yoshino | ..................... 303/152 |
| 2001/0005704 A1 * | 6/2001 | Kitano et al. | ............... 477/107 |
| 2002/0036429 A1 * | 3/2002 | Shimada et al. | ............ 303/152 |
| 2002/0105188 A1 | 8/2002 | Tomikawa | |
| 2004/0176203 A1 * | 9/2004 | Supina et al. | ................... 475/8 |
| 2005/0151420 A1 * | 7/2005 | Crombez et al. | ........... 303/152 |

FOREIGN PATENT DOCUMENTS

| | | |
|---|---|---|
| DE | 195 49 259 | 3/1997 |
| EP | 1 110 785 | 6/2001 |

OTHER PUBLICATIONS

"Kraftfahrtechnisches Taschenbuch" (Automotive Handbook), Robert Bosch GmbH, Düsseldorf, 21st Edition, pp. 555-559.

\* cited by examiner

Primary Examiner—Thomas G. Black
Assistant Examiner—Christine M Behncke
(74) Attorney, Agent, or Firm—Kenyon & Kenyon LLP

(57) ABSTRACT

A method for regulating the drive torque following a load change in hybrid vehicles, in which the drive torque is influenced in a load change in that a brake slip at the driven wheel of the hybrid vehicle as a result of the load change is already counteracted in the beginning phase, in such a way that any effect on the lateral stability and thus the stability of the hybrid vehicle during driving is excluded. When brake slip occurs at the driven wheels because of a load change, the drive torque is applied via the electromotor(s) of the hybrid vehicle.

8 Claims, 1 Drawing Sheet

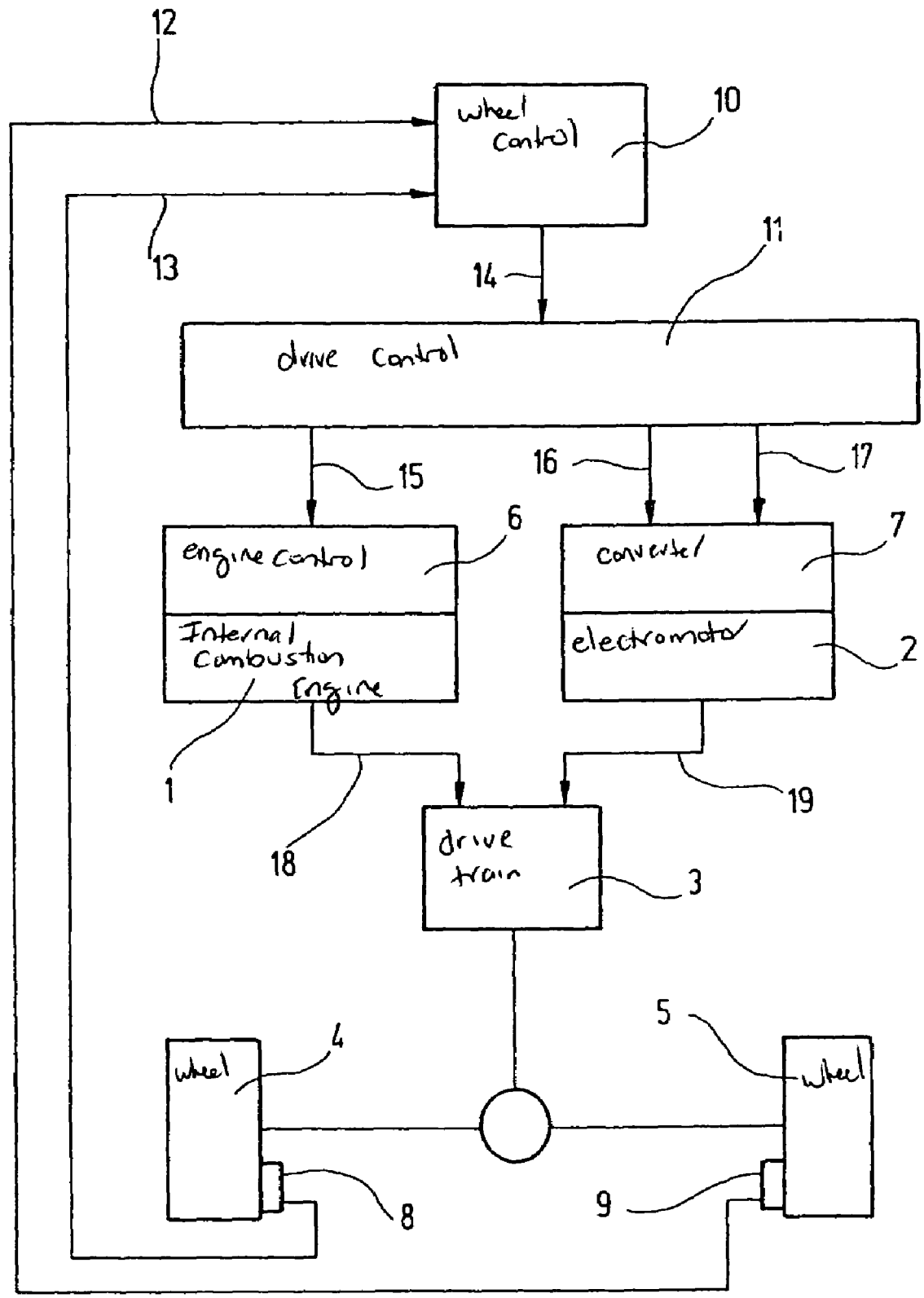

METHOD AND DEVICE FOR REGULATING THE DRIVE TORQUE FOLLOWING A LOAD CHANGE IN HYBRID VEHICLES

FIELD OF THE INVENTION

The present invention relates to a method for regulating the drive torque following a load change in hybrid vehicles, in which the drive torque is influenced in a load change in that a brake slip occurring at the driven wheel of the hybrid vehicle in response to the load change is already counteracted in the beginning phase, in such a way that an effect on the cornering stability and thus on the stability of the hybrid vehicle during driving is obviated. Furthermore, the present invention relates to a device for implementing the method of regulating the drive torque following a load change.

BACKGROUND INFORMATION

In motor vehicles it may happen that, because of the engine-drag torque, the driven wheels exhibit brake slip in response to a load change. This reduces the cornering stability of the motor vehicle and the motor vehicle becomes unstable. For this reason, it is necessary to reduce the brake slip as quickly as possible. It is conventional to use an engine-drag-torque control for this purpose in order to automatically regulate the engine torque in such a way that the brake torque disappears again as quickly as possible. Nevertheless, in conventional motor vehicles having a gasoline engine, a relatively long time elapses before the increase in the engine torque requested by the engine-drag-torque control has an effect on the driven wheels. The reason for this is that first the opening of the throttle valve and then the air-intake involve a time delay.

In order to prevent a decrease in the cornering stability of the vehicle, so that the vehicle stability remains unaffected, motor vehicles use traction control systems. Such systems, which prevent spinning of the driven wheels and regulate the traction slip to permissible values are described in, for example, "Kraftfahrtechnisches Taschenbuch" [Automotive Handbook], Robert Bosch GmbH, Düsseldorf, 21st edition, pages 555-559. The drive slip is regulated in that, for example, the drive torque is reduced when a limit value of the drive slip is reached. This reduction may be achieved by adjusting the ignition point or the internal combustion engine, or by other conventional methods. Regardless of the manner in which the conventional traction control systems reduce the drive torque once a limit value of the drive slip has been reached, all of the conventional traction control systems have the inherent disadvantage that the traction control system is not only insufficiently controllable, but also the engine adjustment always involves a considerable time factor, so that, overall, a certain time characteristic of the drive torque reduction cannot be achieved.

German Patent Application No. DE 195 49 259 describes a traction control system for hybrid vehicles that avoids the disadvantages inherent in the traction control systems used in conventional motor vehicles. This is achieved by a drive system having a traction control system in which the electromotor is configured in such a way that it reduces the drive slip by lowering the drive torque of the drive unit, this being accomplished by the action of the brake and/or by clutch slip action in electromotors acting as clutch. In this case, the traction control system takes action only when a limiting value of the drive slip is exceeded. If a condition resulting therefrom is then present, this traction control system reduces the drive torque acting on the driven wheels with the aid of the electromotor.

SUMMARY

In accordance with an example embodiment of the present invention, a method and a device are provided for regulating the drive slip following a load change in hybrid vehicles in that both the method and the device increase the drive torque as quickly as possible when the driven wheels exhibit brake slip in response to a load change. In this way, the lateral stability of the hybrid vehicle is also maintained in a load change and the hybrid vehicle thus retains its stability during driving.

These advantages may be achieved by a method in which the drive torque is applied via the electromotor(s) of the hybrid vehicle when a brake slip occurs at the driven wheels in response to a change in load. In implementing the method once a brake slip has been detected following a load change, the setpoint drive torque is calculated and input for a drive control in which the setpoint torque for the internal combustion engine and the setpoint torque for the electromotor(s) are determined by an algorithm for the operating strategy and the setpoint torque of the electromotor(s) is set to be equivalent to the setpoint drive torque if the setpoint drive torque is less than or equal to the maximum possible drive torque of the electromotor(s) in the instantaneous operating point. A precondition for adjusting the setpoint torque of the electromotor(s) so that it is equivalent to the setpoint drive torque is always that a query regarding the charge state of the battery has indicated that the battery holds a sufficient charge.

If the condition according to which the setpoint drive torque be less than or equal to the maximally possible drive torque of the electromotor(s) in the instantaneous operating point is not satisfied, the combustion engine, in a further development of the method according to the present invention, applies the portion of the torque that exceeds the maximally possible drive torque of the electromotor(s). In order to achieve this, that it, in order to apply the share of the drive torque that exceeds the maximally possible drive torque of the electromotor(s) by way of the internal combustion engine, the electromotor(s) is/are controlled in such a way that the setpoint torque associated with them is equivalent to the maximally possible drive torque of the electromotor(s) in the instantaneous operating point. The internal combustion engine is controlled in such a way that the setpoint torque associated with it is equivalent to the setpoint drive torque minus the maximally possible drive torque of the electromotor(s) in the instantaneous operating point. In this way, it is achieved that the electromotor(s), which generate(s) drive torque considerably faster than an internal combustion engine, is/are able to apply the highest possible portion of the required drive torque as quickly as possible.

On the assumption that the response time of the electromotor(s) is very brief if it/they is/are energized already, the electromotor(s), in implementing the method according to the present invention, is/are already fully energized at the beginning of the load change in that its/their lead value is set to a value that is equivalent to the maximally possible drive torque of the electromotor(s) in the instantaneous operating point. If the engine drag-torque control then specifies an increase in the drive torque, it may not be necessary to first generate the excitation of the electromotor(s). It should be considered here that a load change is detected, for example, by the accelerator value decreasing rapidly or by a gear-shift procedure being initiated.

The detection of brake slip following a load change, on the basis of which the setpoint drive torque is calculated and input for the drive control, is implemented on the basis of data resulting from the signals that are associated with the speeds of the driven wheels.

The effects intended by the present invention are not only attained when the method according to the present invention is applied in hybrid vehicles having two-wheel drive, but also when it is applied in hybrid vehicles having all-wheel drive.

To implement the example method according to the present invention, a device is provided in which each driven wheel is assigned a wheel-speed sensor that detects the speed of the driven wheels. The wheel-speed sensors are in operative connection with a wheel control in such a way that it is able to detect brake slip following a load change if the wheel control receives information regarding a brake slip via signals generated by the wheel-speed sensors. The wheel control is able to calculate the setpoint-drive torque of the hybrid vehicle, which it inputs for a drive control where both the setpoint torque for the internal combustion engine and the setpoint torque for the electromotor(s) are ascertainable by an algorithm for the operating strategy.

In this device, after querying the charge state of the battery and ascertaining a sufficient load state, the drive control is able to set the setpoint torque of the electromotor(s) to be equivalent to the setpoint drive torque, if $$M_{MSR}^{x} \leq M_{EM\_Max},$$

$M_{EM\_Max}$ representing the maximally possible drive torque of the electromotor(s) in the instantaneous operating point.

If the condition $$M_{MSR}^{x} \leq M_{EM\_Max}$$

is not satisfied, the drive control of the system is able to control the electromotor(s) in such a way that its/their setpoint torque is equal to the maximally possible drive torque in the instantaneous operating point and the internal combustion engine is able to be controlled in such a way that its setpoint torque is $$M_{VM}^{x} = M_{MSR}^{x} - M_{EM\_Max}$$

The example device ensures that the electromotor(s) is/are fully energizable at the beginning of a load change in that its/their lead value $$M_{EMVor}^{x} - M_{EM\_Max}$$

is able to be set, so that the response time of the electromotor(s) is very brief.

BRIEF DESCRIPTION OF THE DRAWING

The FIGURE shows a block diagram of an example device for realizing an example method of regulating the drive torque following a load change in hybrid vehicles.

DETAILED DESCRIPTION OF EXAMPLE EMBODIMENT

In the block diagram shown in the FIGURE, a hybrid vehicle having 2-wheel drive is assumed, in which an electromotor 2 is provided in addition to internal combustion engine 1. Via a transmission, internal combustion engine 1 as well as electromotor 2 are in operative connection with driven wheels 4, 5 of the hybrid vehicle. An engine control 6 is assigned to internal combustion engine 1, and a converter 7 to electromotor 2. Internal combustion engine 1 introduces a torque $M_{VM}$ (signal 18) and electromotor 2 introduces a torque $M_{EM}$ (signal 19) into the drive train.

In order to be able to increase the drive torque in these hybrid vehicles as quickly as possible when driven wheels 4, 5 exhibit brake slip in response to a load change, that is, in order to retain the lateral stability in a load change of the hybrid vehicle so that the hybrid vehicle retains its stability during driving even when brake slip occurs at driven wheels 4, 5 due to a load change, the drive torque is applied via electromotor 2.

The FIGURE shows components of the example device for regulating the drive torque following a load change in the hybrid vehicle are wheel speed sensors 8, 9, which are assigned to driven wheels 4, 5 and detect the speed of driven wheels 4, 5; a wheel control—ESP, ABS—10, and a drive control 11. Wheel speed sensors 8, 9 are in operative connection to wheel control 10, in such a way that it detects brake slip following a load change when wheel control 10 receives signals 12 $n_{wheel-left}$ and 13 $n_{wheel-right}$, generated by wheel speed sensors 8, 9, with information regarding a brake slip. If wheel control 10 has detected brake slip following a load change, wheel control 10 inputs the setpoint drive torque $M^{MSRx}$ (signal 14) of the hybrid vehicle for drive control 11, where both the setpoint torque $M_{VM}^{x}$ (signal 15) for internal combustion engine 1 and also setpoint torque $M_{EM}^{x}$ (signal 16) for electromotor (signal 16) are ascertained via an algorithm for the operating strategy.

At the same time, drive control 11 queries the charge state of the battery, which is not shown further in the block diagram. If the query has shown that the battery is sufficiently charged, drive control 11 sets setpoint torque $M_{EM}^{x}$ of electromotor 2 so that it is equivalent to setpoint drive torque $M^{MSRx}$ if drive torque $M_{MSR}^{x}$ is less or equal to the maximally possible drive torque $M_{EM-Max}$ of electromotor 2 in the instantaneous operating point. If drive control 11 determines that the condition $$M_{MSR}^{x} \leq M_{EM-Max}$$

is not satisfied, drive control 11 controls electromotor 2 in such a way that its setpoint torque $M_{EM}^{x}$ is equivalent to the maximally possible drive torque $M_{EM-Max}$ in the instantaneous operating point. If the condition $$M_{MSR}^{x} \leq M_{EM-Max}$$

is not satisfied, internal combustion engine 1 is controlled in such a way that setpoint torque $M_{VM}^{x}$ assigned to internal combustion engine 1 is equivalent to setpoint drive torque $M^{MSRx}$ minus the maximally possible drive torque $M_{EM-Max}$ of electromotor 2 in the instantaneous operating point. In this way, it is achieved that internal combustion engine 1 applies the portion of the drive torque that exceeds the maximally possible drive torque $M_{EM-Max}$ of electromotor 2 in the instantaneous operating point, so that electromotor 2 applies the highest possible portion of the required drive torque as quickly as possible.

Although not shown further in the drawing, preferably, electromotor 2 should always be fully energized at the beginning of a load change in that the lead value $M_{EMVor}$ (signal 17) of setpoint torque $M_{EM}^{x}$ of electromotor 2 is set to be equivalent to the maximally possible drive torque $M_{EM-Max}$ in the instantaneous operating point. If the conventional engine-drag torque control (likewise not shown further) then specifies an increase in the drive torque, it will not be necessary to first generate the excitation of electromotor 2. Thus, electromotor 2 is already energized and its response time is very rapid should it be required to apply the drive torque when brake slip occurs at driven wheels 4, 5 in response to a load change.

What is claimed is:

1. A method for regulating drive torque following a load change in a hybrid vehicle, comprising:
   influencing the drive torque at driven wheels following the load change so that a brake slip at the driven wheels of the hybrid vehicle resulting from the load change is counteracted in a beginning phase in such a way that an effect on lateral stability and on stability of the hybrid vehicle during driving, is excluded;
   when brake slip occurs at the driven wheels because of the load change, applying the drive torque via at least one electromotor of the hybrid vehicle;
   upon detection of the brake slip following a load change, calculating a setpoint drive torque and inputting the calculated setpoint drive torque for a drive control in which a drive torque for an internal combustion engine of the hybrid vehicle and drive torque for the electromotor are determined by an algorithm for an operating strategy, and which sets a setpoint torque of the electromotor to be equivalent to the calculated setpoint drive torque if the calculated setpoint drive torque is less or equal to a maximally possible drive torque of the electromotor in an instantaneous operating point; and
   if a condition according to which the calculated setpoint drive torque is less or equal to the maximally possible drive torque of the electromotor in the instantaneous operating point, is not satisfied, applying by the internal combustion engine, a portion of the drive torque that exceeds the maximally possible drive torque of the electromotor;
   wherein the setpoint torque of the electromotor is set to be equivalent to the calculated setpoint drive torque if a query of a charge state of a battery has shown that the battery is sufficiently charged.

2. The method as recited in claim 1, wherein, for the internal combustion engine to apply the portion of the calculated setpoint drive torque that exceeds the maximally possible drive torque of the electromotor, the electromotor is controlled in such a way that the setpoint torque of the electromotor is equivalent to the maximally possible drive torque of the electromotor in the instantaneous operating point, and the internal combustion engine is controlled in such a way that the setpoint torque of the internal combustion engine is equivalent to the calculated setpoint drive torque minus the maximally possible drive torque of the electromotor in the instantaneous operating point.

3. The method as recited in claim 2, wherein at a beginning of the load change, the electromotor is fully energized in that a lead value of the setpoint torque of the electromotor is set to be equivalent to the maximally possible drive torque of the electromotor in the instantaneous operating point.

4. The method as recited in claim 1, wherein the detection of brake slip is implemented on the basis of data resulting from signals assigned to speeds of the driven wheels.

5. The method as recited in claim 1, further comprising:
   implementing the method in a hybrid vehicle having 2-wheel drive.

6. The method as recited in claim 1, further comprising:
   implementing the method in a hybrid vehicle having all-wheel drive.

7. A device for regulating drive torque following a load change in a hybrid vehicle, comprising:
   a respective wheel speed sensor assigned to each driven wheel of the hybrid vehicle, the wheel speed sensors configured to detect a speed of the driven wheels;
   a wheel control, the wheel speed sensors being in operative connection with the wheel control in such a way that the wheel control detects brake slip of the drive wheels via signals generated by the wheel speed sensors, the wheel control being configured to calculate a setpoint drive torque of the hybrid vehicle, which is input for a drive control in which both a setpoint torque for an internal combustion engine and a setpoint torque for an electromotor is determined by an algorithm for an operating strategy,
   wherein the drive control is configured to set the setpoint torque of the electromotor to be equivalent to the setpoint drive torque ($M_{MSR}^x$) if $$M_{MSR}^x \leq M_{EM\_Max},$$

$M_{EM\_Max}$ representing a maximally possible drive torque of the electromotor in an instantaneous operating point, upon querying a charge state of a battery and ascertaining a sufficient charge state, and
   wherein the electromotor is controlled by the drive control in such a way that the setpoint torque ($M_{EM}^x$) of the electromotor is equivalent to the maximally possible drive torque in the instantaneous operating point, and the internal combustion engine is controlled in such a way that the setpoint torque of the internal combustion engine ($M_{VM}^x$) is $$M_{VM}^x = M_{MSR}^x - M_{EM\_Max}$$

if the condition $$M_{MSR}^x \leq M_{EM\_Max}$$

is not satisfied.

8. The device as recited in claim 7, wherein the electromotor is fully energizable at a beginning of a load change in that its lead value $$M_{EMVor}^x = M_{EM\_Max}$$

is able to be set.

* * * * *